United States Patent

[11] 3,581,148

[72] Inventor Roger Raoul Brignet
 98, Rve Saint Spire, Corbeil-Essones, France
[21] Appl. No. 830,312
[22] Filed June 4, 1969
[45] Patented May 25, 1971
 Continuation-in-part of application Ser. No. 637,470, May 10, 1967.

[54] DIRECT CURRENT STATIC TRANSFORMER
 4 Claims, 4 Drawing Figs.
[52] U.S. Cl. ..................................................... 315/227,
 313/306, 313/309, 313/336, 313/351, 315/231,
 307/149, 323/44
[51] Int. Cl. ....................................................... H05b 37/00,
 H05b 39/00, H05b 41/14
[50] Field of Search........................................... 313/306,
 307, 308, 309, 336, 351; 315/35, 36, 227, 231;
 323/44; 307/149

[56] References Cited
UNITED STATES PATENTS
2,287,749 6/1942 Slayter .......................... 313/309X
2,204,564 6/1940 Bennett ......................... 313/351X
FOREIGN PATENTS
29,854 7/1964 Germany....................... 313/309

Primary Examiner—John W. Huckert
Assistant Examiner—B. Estrin
Attorney—Kinzer, Dorn & Zickert ABSTRACT: A direct current static transformer for continuous operation comprising a series of successive stages each including a first conductive plate having a multiplicity of thin, needlelike individual electrodes directed toward a second conductive plate, the second conductive plate having a relatively smooth surface facing toward the needle electrodes. Each stage further includes an electrically conductive grid interposed between the first and second plates, the grid being electrically connected to the first plate. The second plate for one stage constitutes the first plate for the next succeeding stage in the transformer. In a preferred construction, there are two such series of successive stages, one series connected to the positive terminal of a DC supply and the other series connected to the negative terminal, with a capacitor connected between the corresponding plates of the two series in each stage.

PATENTED MAY25 1971 3,581,148
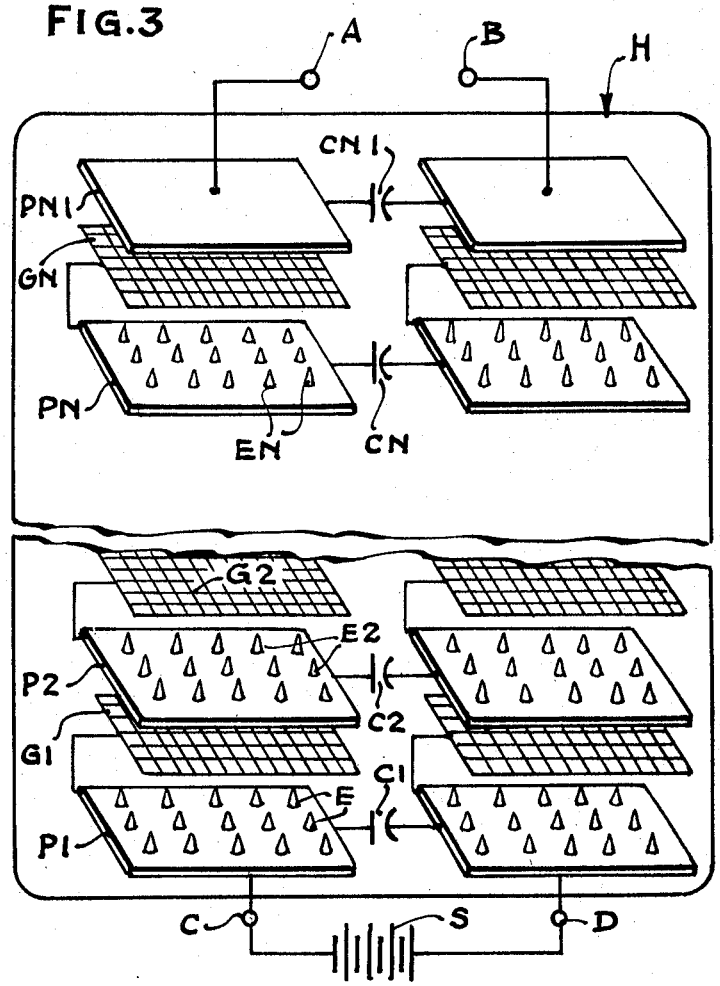
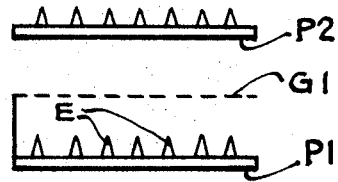
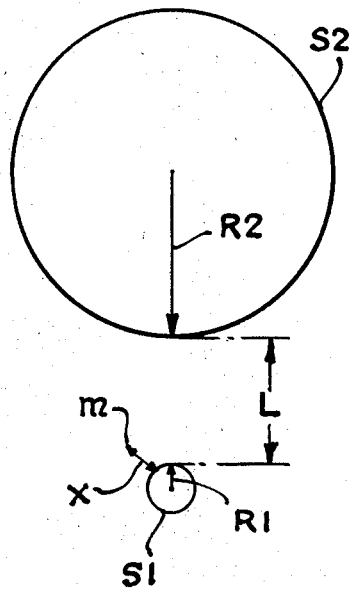
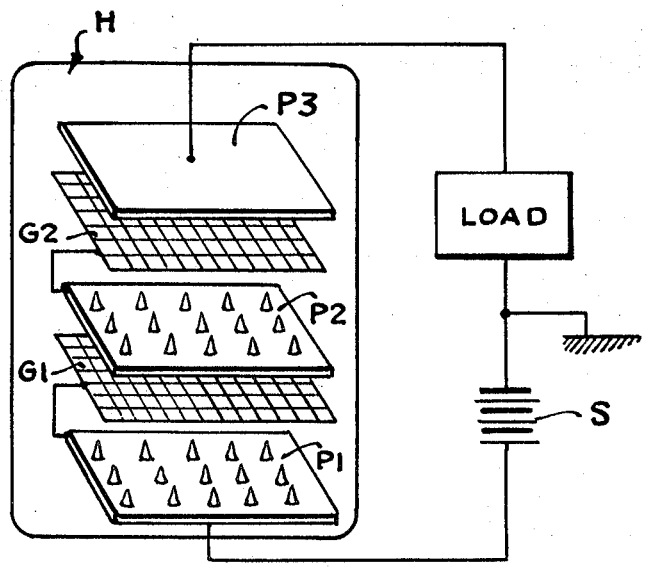

DIRECT CURRENT STATIC TRANSFORMER

CROSS REFERENCES TO RELATED APPLICATIONS

This application is a continuation-in-part of application Ser. No. 637,470 filed May 10, 1967 and is based upon applications filed in France, Ser. No. 61681 filed May 16, 1966 and Ser. No. 67994 filed July 2, 1966.

BACKGROUND OF THE INVENTION

In many applications, it is desirable to utilize direct current apparatus. But a continuing difficulty, in the utilization of DC equipment, is the lack of an effective transformer for increasing or decreasing the voltage of an available DC supply, if the supply does not happen to match the voltage requirements of the load. This is particularly true in the case of equipment of a relatively complex nature that may entail the necessity of affording two or more different DC energizing voltages. To some extent, this need has been met by mechanical transforming devices and by AC-DC conversion equipment. However, there exists a continuing need for a static DC voltage transformer that does not require mechanical operation to be effective and that does not entail an AC-DC conversion.

SUMMARY OF THE INVENTION

The invention relates to a continuous current transformer that is capable of supplying a utilization circuit with an electrical current at a different voltage from that of a DC source that feeds the transformer. Specifically, the transformer is capable of supplying a direct current at a voltage exceeding that of the DC source that feeds the transformer without the intervention of any mechanical device. Furthermore, the static transformer of the invention requires no conversion of alternating current into direct current, or vice versa, in carrying out its operations.

The operation of static transformer of the present invention is made possible by utilizing kinetic energy communicated to the ions of a rarefied gaseous medium by a multiplicity of electrically conductive needlelike electrodes, or other electrodes having substantially identical electrostatic behavior (that is to say, able to have powerful electrical charge densities on their surfaces). This kinetic energy is utilized to overcome the electrical field of an output plate, facing the array of needlelike electrodes, in each stage of the transformer. To attain the objective of effective voltage conversion, the transformer is provided with a series of stages, all situated in an enclosure containing a gas atmosphere, preferably a chemically inert gas, at low pressure.

Each stage of the transformer comprises a series of similarly oriented electrically conductive needlelike electrodes with the bases of all of these electrodes in conductive electrical contact with the surface of a conducting plate, sometimes referred to as the lower plate of the stage in question. An electrically conductive grid is included in each stage, being disposed in spaced parallel relation to the lower plate of the stage. Each stage further includes a second electrically conductive plate, sometimes called the upper plate or output plate, that is disposed in spaced parallel relation to the lower plate beyond the conductive grid. That is, the grid is interposed between the input plate and the output plate. The output plate is not connected to the grid and is not provided with the conductive needle electrodes that characterize the lower plate, in this stage of the transformer. The grid serves to isolate the needle electrodes, electrostatically, from the electrical field of the upper plate, while allowing passage of ions accelerated by the needle electrodes of the lower plate toward the upper plate.

The surface of the upper plate facing away from the grid, in the stage just described, may be provided with a series of needle electrodes, constituting the lower plate in a succeeding stage of the transformer. That is, a single plate may have a flat surface, constituting the upper plate of one stage, and needle electrodes on the opposite surface so that it comprises the lower plate for a succeeding stage. The transformer is preferably composed of two series of stages, the number of stages in each series being the same. One series of transformer stages is connected to the positive terminal of a DC supply and the other series is connected to the negative terminal. In this construction, a capacitor is preferably connected between the corresponding plates of the two series in each stage.

BRIEF DESCRIPTION OF THE DRAWING

FIG. 1 is a schematic illustration of a single stage of a static direct current transformer constructed in accordance with the present invention;

FIG. 2 is an explanatory diagram employed in describing the principle of operation of the transformer;

FIG. 3 is a schematic diagram of a complete static transformer constructed in accordance with a preferred embodiment of the present invention; and FIG. 4 is a schematic diagram of another embodiment of the invention.

DESCRIPTION OF THE PREFERRED EMBODIMENTS

In the drawings, FIG. 1 illustrates a single stage of a static direct current transformer constructed in accordance with the invention. The transformer stage illustrated in FIG. 1 comprises a first or lower plate P1 disposed in parallel spaced alignment with a second electrically conductive plate P2. Plate P1 has a multiplicity of pointed or needlelike electrodes E of uniform height that are in electrically conductive contact with plate P1 and that project from plate P1 toward plate P2. An electrically conductive mesh grid G1 is interposed between plates P1 and P2 in spaced parallel relation to the two plates. Grid G1 is electrically connected to lower plate P1. The surface of plate P2 facing plate P1 is a smooth surface; there are no needle electrodes projecting from the lower surface of plate P2.

In considering the operation of the transformer stage illustrated in FIG. 1, as discussed more fully hereinafter, the transformer stage construction can be compared with a system of two spheres as illustrated in FIG. 2. The pointed end of each of the needle electrodes E may be considered as essentially equivalent to the surface of a very small sphere S1 having a radius R1 and carrying an electrical charge Q1. The plate P2 is represented, in FIG. 2, by a large sphere S2 having a radius R2 and having an electrical surface charge Q2. It should be understood that the sphere S2 would be much larger than illustrated in FIG. 2, in relation to the sphere S1, so that the surface of the sphere S2 facing the minute sphere S1 that is representative of the point of a needle electrode would have very little curvature. The surfaces of the two spheres S1 and S2 are separated by a minimum distance L. The distance between the centers of the sphere S1 and S2 is $R1+L+R2$. As noted above, $R2 >> R1$.

If a uniform distribution of charges is assumed for the two sphere system illustrated in FIG. 2, it can be demonstrated that the charges are approximately:

1. $Q1 = R1 \cdot V$ for small sphere S1, and,
2. $Q2 = R2 \cdot V2$ for large sphere S2, $V1$ and $V2$ being the respective potentials of the sphere S1 and S2 due to their charges $Q1$ and $Q2$. For effective transformation, ideally, we may have 3. $$V1 > V2 \left[ \frac{R2}{R2+L} \right]$$

If an ion of mass $M$ having a charge $Q3$ of the same polarity as that of the two spheres S1 and S2 exists in the vicinity of the small sphere S1, the ion will be repelled by the sphere S1. The ion will also be repelled by the sphere S2. If $X$ is the distance separating the ion from the small sphere S1, the instantaneous acceleration of the ion will be approximately 4. $$\frac{d^2X}{dt^2} = \frac{Q3}{M} \cdot \left[ \frac{R1 \cdot V1}{(R1+X)^2} - \frac{R2 \cdot V2}{(R2+L-X)^2} \right]$$

The instantaneous speed of the ion will thus be such that

5. $$\left[ \frac{dx}{dt} \right]^2 = \frac{2 \cdot Q3}{M} \int \left[ \frac{R1 \cdot V1}{(R1+X)^2} - \frac{R2 \cdot V2}{(R2+L-X)^2} \right] dx$$

If the ion is located in the immediate vicinity of the small sphere S1, such that the distance $X$ is approximately zero, it will be necessary for the ion to traverse the complete distance $L$ in order to reach the surface of the large sphere S2. To traverse this distance $L$, the ion must have a kinetic energy $W$ equal to or greater than zero, the kinetic energy $W$ being:

$$W = \frac{M}{2}\left(\frac{dx}{dt}\right)^2 = Q3\int_0^L \left[\frac{R1\cdot V1}{(R1+X)^2} - \frac{R2\cdot V2}{(R2+L-X)^2}\right]dx = Q3\left[\frac{V1\cdot L}{R1+L} - \frac{V2\cdot L}{R2+L}\right] \quad (6)$$

If the ion receives adequate kinetic energy in accordance with Equation (6), it can reach sphere S2 and give its charge to the sphere S2 even though the voltage V2 for the sphere S2 may be greater than the voltage V1 for the sphere S1. Thus, it is sufficient for operation if $$\frac{V1}{V2}\left[\frac{R2+L}{R1+L}\right] > 1 \quad (7)$$

a condition that it is quite possible to comply with, even with the voltage relationships described above.

The foregoing operational analogy justifies the principle of operation of the transformer of the present invention. Operation of the static transformer is based upon the fact that the needle electrodes, or members of similar electrostatic behavior, can communicate to the ions enough kinetic energy to overcome the effect of the electrical field of the output plate, even though the output plate is at a potential equal to or exceeding that of the needle electrodes. Of course, it is desirable to have the ions, repelled by the needle electrodes, acquire a maximum speed. The invention enables this objective to be attained.

The transformer, in practical application, is made up of a variable number of stages depending upon the operational ratio to be obtained between the input and output voltages. That is, each stage includes an input or lower plate, such as the plate P1, that is provided with a multiplicity of upwardly facing needle electrodes E, and an output plate P2 having a surface substantially parallel with plate P1, toward which the needle electrodes E are directed. In addition, each stage includes a grid, such as the grid G1, that is electrically connected to the input plate P1.

A complete transformer constructed in accordance with the invention is illustrated in FIG. 3. In the static transformer illustrated in FIG. 3, there are two series of successive transformer stages, located at the left-hand side and the right-hand side of the figure, respectively. In the first series of transformer stages, at the left-hand side of the transformer, the initial stage comprises the conductive plate P1 having a multiplicity of needlelike electrodes E facing upwardly toward the planar lower surface of a plate P2. A conductive mesh grid G1 is interposed between plates P1 and P2 in parallel spaced relation thereto, grid G1 being electrically connected to plate P1. The second stage in this series is only partly illustrated. The input plate for the second stage is in the plate P2, with its series of needle electrodes E2 facing upwardly toward another output plate (not shown). The second stage is provided with a grid G2 that is electrically connected to plate P2. It is thus seen that plate P2 functions as an output plate for the first stage and as an input plate for the second stage in this portion of the transformer.

The final stage for the static transformer of FIG. 3 is shown in full. The input plate for the final stage of the transformer, in the left-hand series, is the conductive plate PN with its upwardly projecting multiplicity of needlelike electrodes EN. The output plate for the final stage is the plate PN1, which is disposed in parallel spaced relation to the input plate PN. A conductive grid GN is interposed between the plates PN and PN1 in the final stage of the transformer, in parallel spaced relation to both of the plates, and is electrically conducted to the input plate PN in this stage of the transformer.

The second series of transformation stages in the transformer of FIG. 3, located at the right-hand side of the figure, is structurally identical to the first series described above. Thus, every stage in the right-hand series corresponds in size and configuration to the same stage in the left-hand series and is provided with an input plate, a multiplicity of needle electrodes projecting from the input plate toward an output plate, and a conductive mesh grid interposed between the two plates and electrically connected to the input plate. A capacitor C1 is connected between the input plates in the first two stages of the transformer. Similarly, a capacitor C2 is connected between the plate P2 and the second plate in the right-hand series of conversion stages. In the final stage of the transformer, a capacitor CN couples the plate PN to the penultimate plate in the right-hand series, and the last two plates in the transformer are coupled by the capacitor CN1. It is thus seen that the transformer is truly symmetrical about a centerline (not shown) passing through the capacitors C1, C2...CN1. The capacitors are provided for the purpose of storing the electrical energy imparted to the two plates (or surfaces) of the corresponding horizontal levels of the transformer.

In the transformer of FIG. 3, the input connections are taken from a direct current source S, illustrated as a battery. The negative terminal C of the input source S is electrically connected to the lower or input plate P1 in the first stage at the left-hand side of the transformer. The positive terminal D of the DC supply is electrically connected to the input plate in the right-hand series of transformer stages. The output terminals A and B for the transformer are electrically connected to the final output plates in the left-hand and right-hand portions of the transformer, respectively. In operation, a load is connected across terminals A and B. The entire transformer is mounted within a container H containing a rarefied gaseous atmosphere, preferably an inert gas.

It will be apparent that the ions, starting from the surface of an input plate such as the plate P1, and more particularly from the tips of the needle electrodes E, and moving to the surface P2, cannot continue indefinitely to charge the plate P2 because the electrical field of the output plate P2 will soon reach a level sufficient to prevent the arrival of further ions. This action sets up an equilibrium between the potential of the input and output plates (e.g., plates P1 and P2) in any given stage. If the equilibrium point is exceeded, the movement of charges will take place in the opposite direction, as from the plate P2 to the plate P1, until equilibrium is reestablished.

For a single conversion stage like that shown in FIG. 1, the transport phenomenon of charges continues to occur only as long as the output plate P2 does not reach the equilibrium potential beyond which further charging of the plate is precluded. But this interruption of movement of charges will not occur if electrical power is continually transferred from plate P2 to a load. That is, continuing utilization of power from the transformer tends to maintain the output plates (FIG. 3) in each stage at a potential below the equilibrium and permits continuous operation of the transformer. If the transformer is not connected in a complete electrical circuit with a load, the individual conversion stages rapidly reach the equilibrium potential beyond which no further transfer of charges can be accomplished.

From the foregoing description, it will be quite clear that the ion exchanges taking place within the two series of conversion stages in the transformer of FIG. 3 caused the transformer to function as a true direct current static transformer. The specific operation of the transformer depends upon a number of factors. These include the pressure and kind of gas within envelope H; the mean free course of the individual ions in each stage must be of the same order of magnitude as the distance separating the ends of the needle electrodes from the output plate facing them. The dielectric rigidity of the gas must be sufficient so that a substantial potential difference can be tolerated between the two plates in each stage of the transformer. The density of the needle electrodes, per unit area of plate surface, must be sufficient to provide for adequate current through the transformer. The number of stages in the transformer is determined by the desired transformation ratio, but the surfaces of the plates in the individual stages can be made as large as desired to accommodate the current requirements of the transformer. Of course, the plates need not be of planar configuration as illustrated in FIGS. 1 and 3; coaxial cylindrical plates can be utilized and other configurations may be employed if desired.

In the configuration illustrated in FIG. 3, the transformer provides an increased voltage at the terminals A and B as compared with that across the input terminal C and D. If a step-down transformer is desired, the same ratio is obtained by connecting the supply S between the terminals A and B so that the terminals C and D become the output terminals of the transformer.

The action of the electrostatic field from the surface of the plate P2 can interfere with the local intensity of the electrical field set up by the needle electrodes E. This action is minimized by the grid G1, which effectively attenuates the electrostatic effect of the voltage on the surface of plate P1 and enables the retention of sufficiently intense extreme end charges on the needle electrodes despite the development of an appreciable potential difference between plates P1 and P2. In effect, the grid G1 functions as an imperfect electrostatic screen, allowing the presence of extreme end charges on the tips of the needle electrodes despite the field of plate P2 but without forming a sufficiently closed cavity such as to entail an appreciable reduction of charge in the region between the grid and the surface of plate P1.

In constructing a transformer in accordance with the invention, a number of empirical rules may be observed, which will be obvious from the foregoing description. The required surface areas for the plates and the grid in each stage are a function of the power required of the transformer. The distance between the grid and the tips of the needle electrodes (e.g., between needles E and grid G1) is preferably made about twice the overall height of the needles. The separation distance between the grid and the output plate P2 is preferably made approximately twice the height of the needle electrodes. An acceptable needle height is of the order of approximately ½ centimeter. Conventional orthogonal construction may be employed in the conductive mesh of the grids with the separation between grid conductors being of the order of about one-half the needle electrode height. The grid may be constructed of wire with a diameter of the order of ½ millimeter. These parameters are merely exemplary and substantial variations may be made in all instances.

All of the components of an individual stage (e.g., plates P1 and P2 and grid G1) must consist of good electrical conductors, particularly metal. It is preferred that relatively hard metal with a high melting point be used. For practical reasons, soft metals are not desirable, although the operation of the transformer would remain unchanged if the soft metal elements could be held to good dimensional tolerances in the overall structure. Oxidizable metals are preferably avoided.

As mentioned above, the gaseous medium in which the transformer operates is preferably chemically inert at least with respect to the plates and grids. Typical gases that may be employed include argon, helium, hydrogen, krypton and neon. Other gases may also be utilized so long as there is no substantial tendency toward chemical combination between the gas and the metal of the transformer electrodes. As mentioned above, the mean free path of the ions should be of the same order of magnitude as the distance separating the tips of the needles from the plate P2. To meet this requirement, the gas pressure should be quite low. That is, the transformer should be enclosed in a gastight enclosure in which the pressure is substantially lower than atmospheric pressure. The transformer can operate in a vacuum, but this would require heating of the plates to release electrons and ions thermionically, with a substantial loss of efficiency. Accordingly, it is definitely preferable to have the transformer operate in a low-pressure gas atmosphere.

The number of stages for the transformer is of course dependent upon the required transformation ratio. A limited voltage change can be effected even with only one transformation stage.

FIG. 4 illustrates a simplified transformer constructed in accordance with the invention. It comprises a first stage having an input plate P1 with a multiplicity of needle electrodes E facing an output plate P2. A grid G1 is interposed between plates P1 and P2 in spaced parallel relation thereto. The transformer further includes a second stage in which plate P2 is the input plate. For this purpose, plate P2 is provided with a multiplicity of needlelike electrodes E2 facing away from grid G1 toward an output plate P3. A second grid G2 is interposed between plates P2 and P3 in spaced parallel relation thereto. Grid G1 is electrically connected to plate P1 and grid G2 is electrically connected to plate P2.

The input for the transformer of FIG. 4 comprises a DC supply S having its positive terminal connected to the input plate P1 and its negative terminal returned to ground. The output circuit for the transformer comprises a load that is connected between the output plate P3 and ground. The transformer is mounted in a hermetically sealed container H provided with a rarefied inert gas atmosphere. The operation of the transformer of FIG. 4 is essentially similar to that described above and hence need not be repeated.

I claim:

1. A direct current static transformer for continuous voltage transformation operation comprising:

a first series of transformation stages, each transformation stage including:

a first electrically conductive plate of substantial surface area, a second electrically conductive plate of corresponding surface area disposed in parallel spaced relation to said first plate, a multiplicity of pointed, needlelike electrodes of given length each affixed to said first plate in electrically conductive contact therewith and extending from said first plate toward said second plate, and a conductive grid, interposed between said plates in spaced relation to the free ends of the needle electrodes and to the second plate, said grid being electrically conductively connected to said first plate, the second plate in each stage being electrically conductively connected to the first plate in the succeeding stage in each series;

a second series of transformation stages, equal in number and corresponding in construction to the stages in the first series;

a first pair of terminals, each connected to the first plate in the first stage of a respective one of said series;

and a second pair of terminals, each connected to the second plate in the last stage of a respective one of said series;

said transformer operating as a step-up transformer when a direct current supply is connected between said first pair of terminals and a load is connected between said second pair of terminals, said transformer operating as a step-down transformer when a direct current supply is connected between said second pair of terminals and a load is connected between said first pair of terminals.

2. A direct current static transformer according to Claim 1, in which the second conductive plate of the first stage in each series is provided with a multiplicity of pointed, needlelike electrodes projecting from the surface thereof opposite said conductive grid of said first stage, so that said second plate of said first stage comprises the first plate for the second stage in the series, and in which a similar construction is carried through the remaining stages in each series, with each stage in each series including at least one plate that serves as an input plate for one stage and an output plate for the next adjacent stage.

3. A direct current static transformer according to Claim 2, and further comprising a plurality of capacitors, each electrically connected between a respective plate in the first series of transformation stages and the corresponding plate in the corresponding stage of the second series.

4. A direct current static transformer according to Claim 1 in which all of said transformation stages are immersed in a rarefied inert gas atmosphere of low pressure such that the mean free path of ions moving in said atmosphere is of the same order of magnitude as the spacing between the second conductive plate and the tip ends of the needle electrodes.